| 
US008136095B2

(12) United States Patent
Natanov et al.

(10) Patent No.: US 8,136,095 B2
(45) Date of Patent: Mar. 13, 2012

(54) RELATIONS IN FUZZING DATA

(75) Inventors: Nissim Natanov, Redmond, WA (US); John Neystadt, Kfar Saba (IL)

(73) Assignee: Microsoft Corporation, Redmond, WA (US)

( * ) Notice: Subject to any disclaimer, the term of this patent is extended or adjusted under 35 U.S.C. 154(b) by 1118 days.

(21) Appl. No.: 11/959,469

(22) Filed: Dec. 19, 2007

(65) Prior Publication Data
US 2009/0164478 A1 Jun. 25, 2009

(51) Int. Cl.
*G06F 9/44* (2006.01)
*G06F 9/445* (2006.01)

(52) U.S. Cl. ........ 717/126; 717/101; 717/127; 717/168; 717/178

(58) Field of Classification Search .......... None
See application file for complete search history.

(56) References Cited

U.S. PATENT DOCUMENTS

| | | | |
|---|---|---|---|
| 5,485,409 A | 1/1996 | Gupta et al. | |
| 5,982,932 A | 11/1999 | Prokoski | |
| 6,625,764 B1 | 9/2003 | Dawson | |
| 6,701,460 B1 | 3/2004 | Suwandi et al. | |
| 6,760,713 B2* | 7/2004 | Beier et al. | 706/7 |
| 7,051,322 B2 | 5/2006 | Rioux | |
| 7,131,036 B2 | 10/2006 | Wray et al. | |
| 7,191,172 B2 | 3/2007 | McGrath et al. | |
| 7,512,583 B2* | 3/2009 | Benson et al. | 706/59 |
| 7,849,448 B2* | 12/2010 | Yunus et al. | 717/126 |
| 2002/0165625 A1* | 11/2002 | Beier et al. | 700/50 |
| 2004/0044999 A1* | 3/2004 | Gibson | 717/178 |
| 2004/0111727 A1 | 6/2004 | Schwarzbauer et al. | |
| 2005/0131751 A1 | 6/2005 | Ahlers et al. | |
| 2005/0135260 A1 | 6/2005 | Todd | |
| 2005/0273860 A1 | 12/2005 | Chess et al. | |
| 2006/0253739 A1 | 11/2006 | Godefroid et al. | |
| 2006/0277606 A1* | 12/2006 | Yunus et al. | 726/25 |
| 2007/0011108 A1* | 1/2007 | Benson et al. | 706/8 |
| 2007/0143407 A1 | 6/2007 | Avritch et al. | |
| 2007/0203973 A1 | 8/2007 | Landauer et al. | |
| 2008/0052699 A1* | 2/2008 | Baker et al. | 717/168 |
| 2008/0082957 A1* | 4/2008 | Pietschker et al. | 717/101 |
| 2008/0301647 A1* | 12/2008 | Neystadt et al. | 717/127 |
| 2009/0222774 A1* | 9/2009 | Grosse et al. | 716/5 |

OTHER PUBLICATIONS

Jefferson Offutt, A Practical System for Mutation Testing Help for the Common Programmer, Oct. 1994, Proceedings., International, 1994 IEEE, <http://ieeexplore.ieee.org/stamp/stamp.jsp?tp=&arnumber=528535>.*

Kamel Ayari, Automatic Mutation Test Input Data Generation via Ant Colony, Jul. 2007, ACM, <http://dl.acm.org/citation/cfm?id=1277172>.*

(Continued)

*Primary Examiner* — Thuy Dao
*Assistant Examiner* — Cuong V Luu

(57) ABSTRACT

A test tool is provided for testing a software component. The tool receives data structured and formatted for processing by the software component. The structured data might conform to a schema defining valid inputs that the software component is able to parse/process. The test tool selects a discrete part of the structured data and fuzzes the selected discrete part. The test tool determines whether there are any parts of the structured data whose validity can be affected by fuzzing of the discrete part of the structured data. The fuzzed discrete part of the structured data is analyzed and a related part of the structured data is updated to be consistent with the fuzzed discrete part. The fuzzing tool passes the structured data with the fuzzed part and the updated part to the software component being tested. The software component is tested by having it process the data.

18 Claims, 6 Drawing Sheets

OTHER PUBLICATIONS

Roland H. Untch, Mutation Annalysis Using Mutant Schemata, 1993, ACM-ISSTA'93, <http://dl.acm.org/citation.cfm?id=154265>.*

Dan Hao, A Similarity-Ware Approach to Testing Based Fault Localization, Nov. 2005, ACM, <http://dl.acm.org/citation.cfm?id=1101908>.*

Xiong Li, Fuzzy Similarity-based Data Fusion Algorithm and Its Application to Engine Testing, Jul. 2005, 2005 IEEE, <http://ieeexplore.ieee.org/stamp/stamp.jsp?tp=&arnumber=1547345>.*

Jonathan Lee, Current Approaches to Extending Fuzzy Logic to Object-Oriented Modeling, Jul. 2001, NAFIPS, Joint 9th, vol. 4, <http://ieeexplore.ieee.org/stamp/stamp.jsp?tp=&arnumber=944432>.*

"Black Box Security Testing Tools", https://buildsecurityin.us-cert.gov/daisy/bsi/articles/tools/black-box/261.html, 2005—28 pages.

"Differential Code Coverage", Date: Jun. 16, 2005, pp. 1-16.

"FuzzingTools", http://www.threatmind.net/secwiki/FuzzingTools, Dec. 14, 2007—6 pages.

"Model-Based Testing", http://en.wikipedia.org/wiki/Model-based_testing, Dec. 13, 2007—6 pages.

"PICT Modeling tool", http://download.microsoft.com/download/f/5/5/f55484df-8494-48fa-8dbd-8c6f76cc014b/pict33.msi, Dec. 13, 2007—14 pages.

"The Mathematics of Monkeys and Shakespeare", http://www.nutters.org/docs/monkeys, Dec. 13, 1995.

"Using PAGEHEAP on Windows", http://support.microsoft.com/default.aspx?scid=kb,en-us,286470, Mar. 7, 2007—5 pages.

Godefroid, et al., "Automated Whitebox Fuzz Testing", pp. 1-13, 2008.

Medvedev Ivan, "Security Tools for Software Development", Date: 2005, http://download.microsoft.com/download/0/1/a/01a053e8-3e18-4f73-b8e7-68d53a8232da/Medvedev_SSW-2005.ppt.

Newsham, et al., "Breaking Forensics Software: Weaknesses in Critical Evidence Collection", Date: Aug. 1, 2007, pp. 1-30.

Wong, et al., "A Web Services Security Testing Framework", Date: Oct. 11, 2006, pp. 1-103.

Faust, Sacha, "Web Application Testing with SPI Fuzzer", Date: 2005, pp. 1-30.

Juranic, Leon, "Using fuzzing to detect security vulnerabilities", Date: Apr. 25, 2006, pp. 1-18.

Neaves, Tom, Software Development and Information Security: an analysis, investigation and experiment into what happens when security is treated as an add-on during developme, 2006 cvl.

* cited by examiner

210

| Name | Purpose |
|---|---|
| sequential group | Multiple elements or groups in the well specified order are contained in the group. |
| single-choice group | Only one element or group out of specified list is contained in the group. |
| string element | String with ASCII or Unicode characters of variable length. Length is fixed or determined by specified terminator. |
| constant string element | Constant string with ASCII or Unicode characters. |
| numeric string element | Number encoded as string. Can be signed or unsigned. Can be integer or floating type. Valid ranges and precision is specified. |
| [type] relation | Any variety of types of relations, where [type] might be length, offset, count, presence, and/or checksum. |

HTTP Response : sequential group
Status Line
… (not needed for the example)
Content-Length : sequential group
"Content-Length:" : Constant String
Spaces : String
Size : Numeric String, holds the size, in bytes, of Request Data
<CRLF> : Constant String (CRLF means New Line)
<CRLF>
HTML Message: String (having size specified in Content-Length header)
Content-Length Relation : Relation object, 'Size' is "length of" 'HTML Message'

RELATIONS IN FUZZING DATA

CROSS-REFERENCE TO RELATED APPLICATIONS

This original application is related to, but does not claim priority to, the following U.S. patent applications: Ser. No. 11/756,150, titled "Testing Software Applications with Schema-based Fuzzing", filed May 31, 2007; Ser. No. 11/756,782, titled "Delivering Malformed Data for Fuzz Testing to Software Applications", filed Jun. 1, 2007; and Ser. No. 11/959,478, titled "Fuzzing Encoded Data", filed Dec. 19, 2007.

BACKGROUND

Discussed below are techniques related to fuzzing data for testing software. Fuzzing is a software technique that involves repeatedly generating malformed data and submitting it to an application to test various parts of the software application. Passing fuzzed data to an application often helps uncover defects and vulnerabilities in the software application. Buffer overruns, crash points, and application deadlocks are typical vulnerabilities that fuzzing reveals. Improved techniques for generating fuzzed test data are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

A test tool is provided for testing a software component. The tool receives data structured and formatted for processing by the software component. The structured data might conform to a schema defining valid inputs that the software component is able to parse and process. The test tool selects a discrete part of the structured data and fuzzes the selected discrete part. The test tool determines whether there are any parts of the structured data whose validity can be affected by fuzzing of the discrete part of the structured data. The fuzzed discrete part of the structured data is analyzed and a related part of the structured data is updated to be consistent with the fuzzed discrete part. The fuzzing tool passes the structured data with the fuzzed part and the updated part to the software component being tested. The software component is tested by having it process the data.

Many of the attendant features will be explained below with reference to the following detailed description considered in connection with the accompanying drawings.

BRIEF DESCRIPTION OF THE DRAWINGS

Embodiments described below will be better understood from the following detailed description read in light of the accompanying drawings, wherein like reference numerals are used to designate like parts in the accompanying description.

FIG. 4 shows example fuzzing schema groups and elements, and an example schema using same.

DETAILED DESCRIPTION

Overview

As mentioned in the Background, fuzzing may involve generating malformed, often random, input data. Embodiments discussed below relate to generating logically consistent fuzzed test data. A problem regarding logical or semantic inconsistencies of fuzzed data are discussed first, followed by description of techniques for generating logically consistent fuzzed test data and using same to test software applications. Some examples of use of the techniques will then be explained.

Logically Inconsistent Fuzzed Test Data

A significant proportion of software development resources are expended on security problems. Many of these security problems result from buffer overruns and crashes. Fuzzing is a testing technique that can help detect these defects. Fuzzing involves generating malformed data, typically by randomly selecting or generating data. A fuzzing tool may generate fuzzed data and submit it to an application to reveal bugs or vulnerabilities in the application. A fuzzing test tool usually starts with original test data, for example a template or data generated therefrom, and randomly manipulates the data. The fuzzed test data is passed to an application being tested. Parsing code in the application may follow a normal or error free path until it reaches the malformed (fuzzed) part of the input data. Such a test may identify places in the application's code where malformed data causes the application to become unstable (for example, reaching a deadlock state) or to crash. Software developers, knowing where the application's code has a vulnerability, may make appropriate corrections.

The present inventors alone have identified a problem with fuzz testing. The problem is that input data, which is often structured in layers or as a hierarchy with nested and interrelated parts, may become internally inconsistent when one part is fuzzed. That is to say, altering one part of valid test input data may cause the application to view other related parts of the test input data as invalid. Often, a field or element of input data contains a value that is computed or derived from another value in another field or element of the input data. When the value in the field or element is changed, the related field or element may become invalid; its value becomes logically inconsistent with the fuzzed value. Consider the following simple example.

Figure 1:
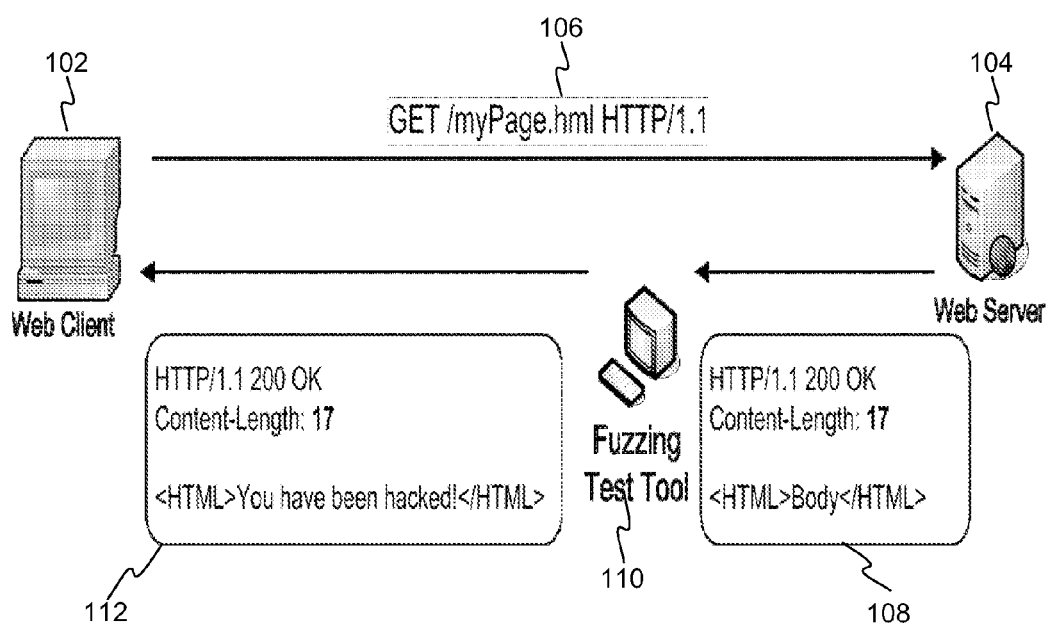
FIG. 1 shows a scenario for testing how a web server handles an HTTP communication from a web client.

FIG. 1 shows a scenario for testing how a web client 102 handles an HTTP communication from a web server 104. The web client 102 sends a "get" HTTP request 106 to Web server 104. The web server 104 receives the request 106 and generates an original HTTP response 108. The original HTTP response 106 has a header field, Content-Length, which contains the web server 104's computed length, 17, of the body of the original HTTP response 108. The value 17 is the length (number of characters) of the body's content: "<HTML>Body</HTML>". The original HTTP response 108 is intercepted by a fuzzing test tool 110. The fuzzing test tool 110 fuzzes the original HTTP response 108 by replacing the original body with the body shown in fuzzed HTTP response 112 ("<HTML> You have been hacked!</HTML>"). As can be seen, the Content-Length field in fuzzed HTTP response 112 contains the original value of 17, which is logically inconsistent with the new fuzzed value body, whose length is 34. A consequence of this inconsistency is explained with reference to FIG. 2.

Figure 2:
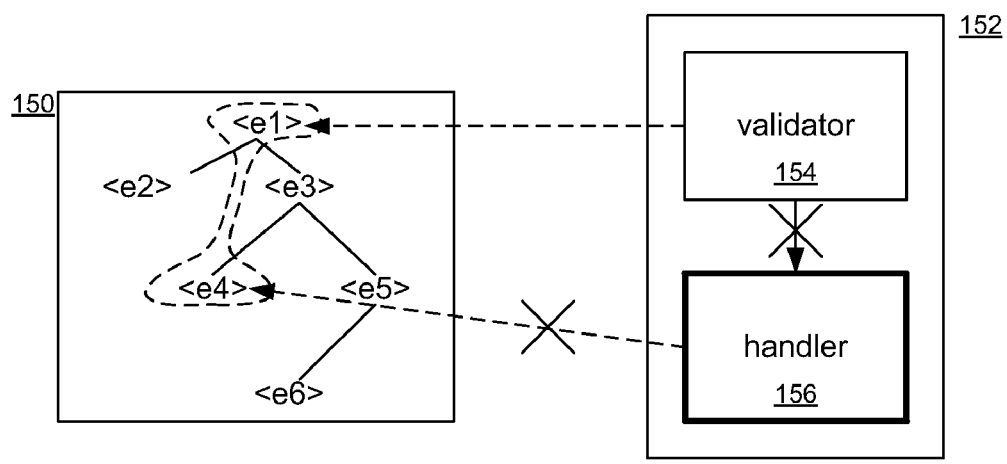
FIG. 2 shows fuzzed test input data being received by an application that is being tested.

FIG. 2 shows fuzzed test input data 150 being received by an application 152 that is being tested. The test input data 150 has a first element <e1> whose value is logically dependent on the value in another element, <e4>. Element <e4> has been fuzzed and the value in element <e1> is now inconsistent with the value in element <e4>. For example, element <e1> may have a field that is required to contain a number of other fields of varying occurrence, which is inconsistent with the content of fuzzed element <e4>. A variety of other types of relations are possible, for example a field might be required to contain a length of another field, a field might indicate a presence of another optional field, etc. Other types of relations might be used, depending on the specific application or implementation. The test input data 150 is received by the application 152. The application 152 has a validator component 154 that checks initial or high-level validity of the test input data 150. For example, validator 154 may check the content of element <e4> and compare it to the requirement of element <e1>. The validator 154 determines that the content in element <e4> does not match the requirement of element <e1>, whose content still corresponds to the pre-fuzzing content of element <e4>. For example, element <e1> might not contain the correct number of fields. If, as is often the case, application 152 goes no further when its validator 154 identifies input data as invalid, then a significant part of application 152 may not execute and therefore may go untested. If application 152 has a handler 154 for substantive processing of input data, that part of the application 152 will not be tested when the input 150 has been found to be invalid as a whole. Note that the inconsistency might instead be between elements <e1> and <e3>. If element <e4> is nested within element <e3>, then the number of fields in element <e3> might change because the change to element <e4> is also a change to element <e3>.

The examples above are for illustration only and are not intended to limit the boundaries of the invention. As discussed below, a variety of types of input and relations between input elements may be susceptible to inconsistency when fuzzed. Techniques for improving the logical consistency of fuzzed test data are explained next.

Techniques for Generating Logically Consistent Fuzzed Test Data

Figure 3:
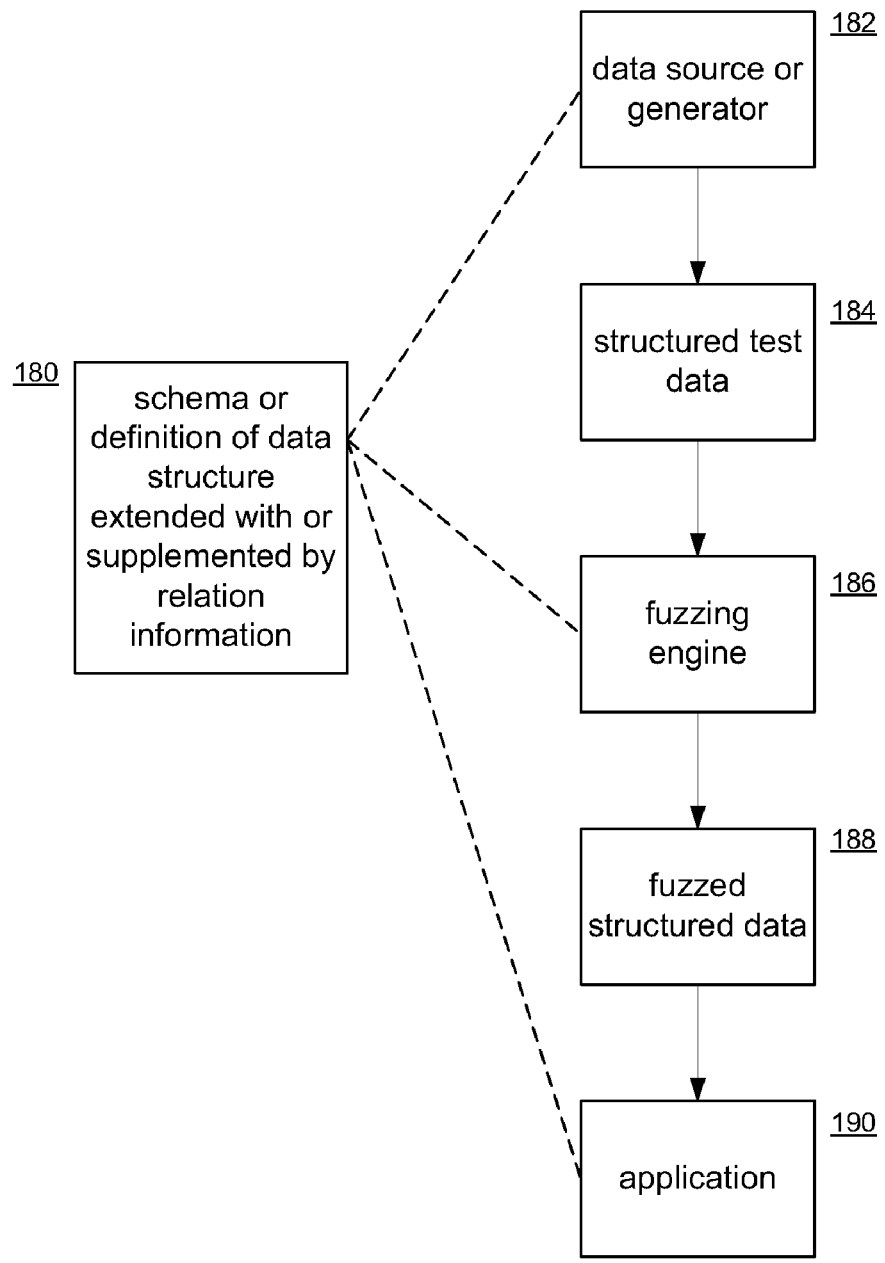
FIG. 3 shows an arrangement for generating logically consistent fuzzed test data.

FIG. 3 shows an arrangement for generating logically consistent fuzzed test data. A schema 180 serves as a basis for fuzzing input data while maintaining logical consistency thereof. First a data source or generator 182 produces structured test data 184. The structured test data 184 might be a message formed according to a communication protocol, a formatted data file, an XML document, etc. The structured test data 184 might be implicitly structured by having pre-defined fields in predefined locations. The structured test data 184 might be explicitly structured, for example using markup language, field delimiters, and so on. While fields or elements of the structured test data 184 might necessarily be structurally related, some may also be computationally or logically interrelated. In one embodiment, information describing a relation between elements or types of elements is included in the schema 180. Relation information is described in more detail with reference to FIG. 4.

Referring again to FIG. 3, the structured test data 184 is received by a fuzzing engine 186, which is a software component running on a computer and configured to execute as described below. The fuzzing engine 186 might receive the test data 184 by any number of means. The test data 184 could be passed to the fuzzing engine 186 as though the fuzzing engine 186 were a target application. Test data 184 addressed and sent to an application can be redirected to fuzzing engine 186. The fuzzing engine 186 can also be configured as a proxy server that receives communications sent to an application.

After receiving the test data 184, the fuzzing engine 186 parses the structured test data 184 (possibly using schema 180), manipulates a part of the structured test data 184, and updates any logically related part that is affected by the manipulated part of the structured test data 184. To do so, the fuzzing engine 186 may use the relation information in the schema 180 to identify the part that is logically related to the manipulated part. The relation information may also identify a relation type or operation (e.g. length, checksum, data type, etc.) which the fuzzing engine 186 can use to compute the new value for the part.

The fuzzed structured test data 188 is then passed to an application 190 that is being tested. Because logical consistency has been maintained in the test data, a more thorough testing of the application 190 is likely. In particular, "deep" logic of the application 190 is more likely to be reached and tested if higher level parts of the application 190 determine that the test data 188 is not only valid in format but logically consistent with itself.

While the fuzzing engine 186 is represented as a discrete component in FIG. 3, the functions performed by the fuzzing engine 186 could also be performed elsewhere. For example, a testing program for generating original input data could also implement logic for generating test input data that satisfies relational requirements between parts thereof.

FIG. 4 shows example fuzzing schema groups and elements 210, and an example schema 212 using same. While any number of types of schema may be used, a tree-based schema is convenient for describing the format, structure, and relations of input data. An XML schema can also be used. If an XML schema already exists for validating input data, it is convenient to extend such a schema with relation information. Valid input data can also be described with a language perhaps in Augmented Backus-Naur Form (ABNF) syntax. Alternatively, valid input can be partially described and a schema may simply have relation information without regard for the structure of the input. Nonetheless, it will be convenient for many software testing tools to have a schema that describes valid input for an application, and it will be convenient to include relation information in association with such schema.

While there are many ways to maintain logical consistency between parts of test data when some parts are fuzzed, it is convenient to extend a tree-based fuzzing data schema. A fuzzing data schema describes the appearance and properties of well formed input for an application. A fuzzing schema should decompose the described input data into groups of other groups or elements and primitive (atomic) elements themselves. Groups may be recursive if needed. That is, one group can contain other groups or primitives. For each element, its type and valid formats thereof should be described. For variable length fields, it may be helpful to include information describing how to detect termination of the field (e.g., whitespace, special character, etc.). An example of fuzzing schema groups and elements 210 is shown in FIG. 4. Two types of groups are allowed (sequential and single-choice), and three primitives—string, constant, and numeric—are also allowed. Example schema 212 is a description for the original/fuzzed HTTP responses 108, 112 in FIG. 1. Schema 212 uses the example schema groups and elements 210 to describe valid input and a relation.

At the end of the schema 212 there is a "Content-Length Relation" field. This field identifies a relationship type ("length of") that can be used to update a field (Content- Length) that is related to and governed by the identified 'HTML Message Body' field. The relation information can take a variety of forms. Furthermore, the relation information need not be included in a schema that completely describes all potential inputs. The relation information could be in a special-purpose file or schema containing only relation information. Regardless of form, prior to generating fuzzed data it is helpful to have stored some relation information that is capable of being used by a fuzzing component to both identify relations between fields or elements in test input data and also is capable of being used to adjust or update a field when a related field has been fuzzed.

Figure 5:
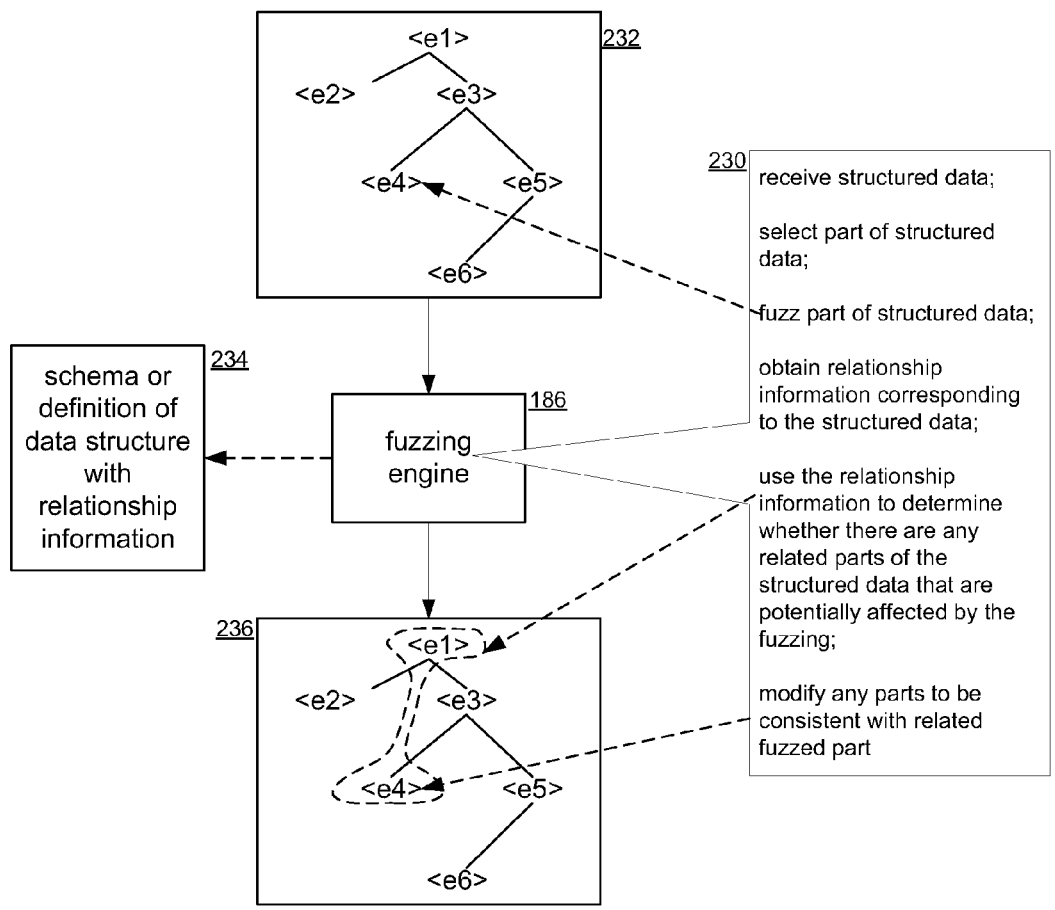
FIG. 5 shows a process for fuzzing test data and using relation information to identify and modify a field related to a fuzzed field.

FIG. 5 shows a process 230 for fuzzing test data and using relation information to identify and modify a field related to a fuzzed field. Fuzzing engine 186 first receives structured data 232 that is to be fuzzed. The fuzzing engine 186 selects a field in data 232 to be fuzzed. In the example of FIG. 5, the selected field is element <e4>. The field can be selected either randomly or it can be selected by an overall testing controller that systematically iterates over various fields in the input data, fuzzing and testing each in turn. Schema 234 can be used to parse the input data 232 and to find the field to be fuzzed.

After being selected, the part or field of the input data 232 is fuzzed. Fuzzing can be performed by randomly permuting the value in the field, generating a new random value, or randomly selecting a new value from a set of values, and so on. In a preferred embodiment, using schema 234, the structured data 232 is parsed and formed as a temporary data structure stored in a memory buffer. The data structure might be a tree with nodes/elements corresponding to fields/elements in the structured data 232. In another embodiment, the structured data 232 is parsed and manipulated in place. In either case, the fuzzed value is eventually stored in the field <e4>. Either before or after storing the value for the fuzzed field, the fuzzing engine 186 obtains relationship information corresponding to the fuzzed/selected field in the structured data 232. This information is used to determine whether there are any related parts of the structured data 232 that are potentially affected by the fuzzing of the selected field. In the example of FIG. 5, relation information that relates element <e4> and <e1> is obtained. The relation information indicates that element <e1> is related to fuzzed element <e4>. The relation information may also indicate the nature or type of the relation, for example, a length/size relation, a count relation, etc. This can be used in the next step, which is to update the field identified as related to the fuzzed field. In the example of FIG. 5, element <e1> would be updated. If the relation were a checksum relation, then a new checksum would be calculated based on the fuzzed value of element <e4> and possibly other elements. In the embodiment where a temporary data structure such as a tree is used, then the updated value would go into the data structure and when fuzz processing is complete fuzzing engine 186 generates the fuzzed data using the data structure. For example, referring to the example in FIG. 1, new HTTP response 112 would be generated from values in the tree. In the embodiment where the structured data 232 is manipulated directly, the new value for the updated field is stored in the structured data 232. With either embodiment, the final result is fuzzed structured data 236 which has a fuzzed field and a logically related whose value has been updated according to the relation information. The fuzzed structured data is passed to the application that is to be tested, which parses and processes the data.

Figure 6:
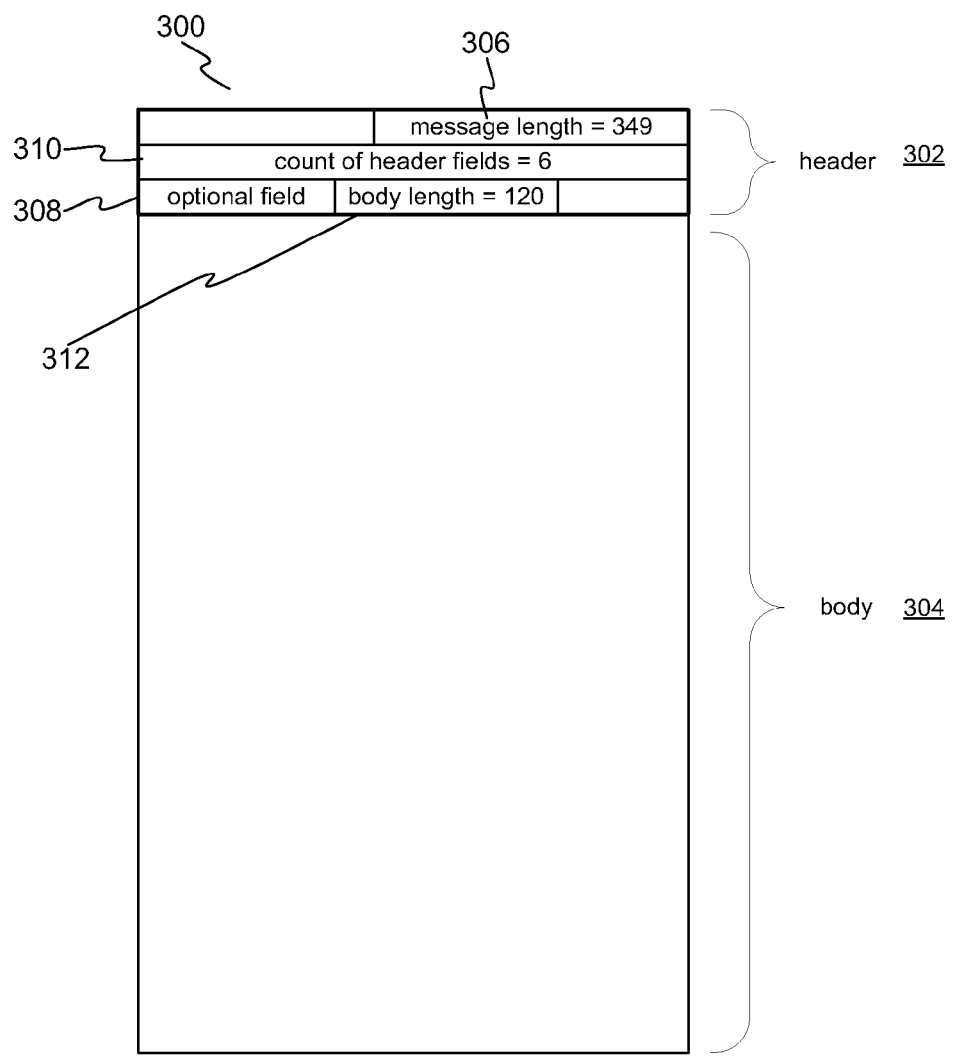
FIG. 6 shows an example input data.

FIG. 6 shows an example input data 300. The input data 300 has a header 302 and a body 304. The header has a number of fields, such as a message length field 306, an optional field 308, a count of header fields 310, and a body length 312. For an application under test to find the input data 300 valid, the fields must contain values that allow the input data 300 to be parsed by the application being tested. For this example, pre-stored relation information would include the following relations: "message length" is length of "message"; "count of header fields" is count of "optional field", "body length", "message length", etc.; "body length" is length of "body". If the "optional field" is fuzzed, and the fuzzing results in the "optional field" being deleted, then the fuzzing process, using the relation about the "count of header fields", would determine that the deletion of the "optional field" requires the "count of header fields" to be updated. In accordance with the type of the relation, the fuzzing process would count the number of header fields. If fuzzing changed the length of the body 304, then two relations that name the length of the body 304 field would be identified. First, the "body length" relation would cause the fuzzer to recompute the "body length" field as a result of the body 304 being updated. Second, the "message length" relation would similarly cause the message length field 306 to be updated.

CONCLUSION

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed by a computing device. The embodiments and features can be performed on any type of computing device, including portable devices, workstations, servers, mobile wireless devices, and so on.

The invention claimed is:

1. A method performed by a computing device configured with a test tool for generating test data to test a software component, the method comprising:

receiving structured data, the structured data conforming to a format or schema of valid inputs that the software component is able to parse and process, the structured data comprising a discrete first part and a discrete second part, the second part having an original value dependent on the first part;

selecting the first part of the structured data and fuzzing the selected discrete first part, the first part then comprising fuzzed data;

accessing relationship information that was stored before the structured data was received, the relationship information identifying a first element type of the format or schema, a second element type of the format or schema, and a function that computes values of the second element type from values of the first element type, wherein the first part comprises an instance of the first element type, and the second part comprises an instance of the second element type, and wherein the fuzzing of the first part causes the original value of the second part to be incorrect relative to the function and the fuzzed first part;

from the relationship information, correlating the first part with the second part and using the relationship information to apply the function to the fuzzed data to compute a new value according to the fuzzed data;

updating the second part of the structured data to be consistent with the fuzzed first part by replacing the original value with the new value; and passing to the software component being tested the structured data with the fuzzed part and the updated second part.

2. A method according to claim 1, wherein the received structured data is a valid instance of data defined by a schema, the schema including relationship information that defines a relationship between two types of data fields, where the relationship indicates a functional dependence between the two types of data fields such that a value of one of the types of data fields is a function of a value of the other type of data field.

3. A method according to claim 2, wherein the analyzing comprises determining that the discrete part of the structured data corresponds to one of the types of data fields defined by the relationship information and the related part of the structured data is updated according to the functional dependence between the two types of data fields.

4. A method according to claim 2, further comprising determining that the functional dependence is applicable to the discrete part of the structured data and in response performing the updating of the related part of the structured data, the updating comprising using the functional dependence to compute a new value for the related part in the structured data.

5. A method according to claim 1, wherein the structured data comprises markup language and data delineated thereby.

6. One or more non-transitory volatile and/or non-volatile computer readable media storing information to enable a computer to run a software testing tool to perform a process of fuzzing a test file to be used to test an application, the process comprising:

accessing the test file, the test file containing structured content, the structured content comprising a plurality of fields formatted and arranged in accordance with a pre-defined format that the application is configured to parse, the content including at least a first field containing a first portion of the structured content, the first portion containing or preceding a second field that comprises a second portion of the structured document, where the second portion will not be parsed by the application if the first portion of the structured content is not successfully parsed by the application, wherein the first portion selected from an original length, size value that depends on a length, size of the second portion, and the first portion comprises an original count value that counts the second field, and wherein the first field will not be parsed if the length value or the count value is determined to be incorrect;

determining that the first field is related to and dependent upon the second field, in response computing, based on the fuzz data, new content selected from a new length, size value that depends on a length, size of the fuzz data, and a new count value that counts the fuzz data, and storing the new content in the second field.

7. One or more volatile and/or non-volatile computer readable media according to claim 6, the process further comprising:

testing the application by passing the test file to the application, the test file having the fuzz data and the new content.

8. One or more volatile and/or non-volatile computer readable media according to claim 6, wherein with respect to the first field being related to and dependent upon the second field: according to the pre-defined format, the first field is to store a length of the second field, and the computing of the new content for the first field comprises computing a length of the fuzz data, the new content comprising the computed length of the fuzz data.

9. One or more volatile and/or non-volatile computer readable media according to claim 6, wherein according to the pre-defined format the first field is to store a value that is a function of the content stored in the second field, and the new content is computed according to that function.

10. One or more volatile and/or non-volatile computer readable media according to claim 6, wherein the pre-defined format comprises a communication protocol and the test file comprises a message received via a network, the message conforming to the communication protocol.

11. One or more volatile and/or non-volatile computer readable media according to claim 6, wherein the pre-defined format comprises a markup language schema and the received test file comprises a markup language document capable of being validated against the markup language schema.

12. One or more volatile and/or non-volatile computer readable media according to claim 6, wherein the computing comprises either determining a length of a field in the test file, determining a count of fields in the test file, determining presence or absence of a field in the test file, computing a checksum, or computing a hash value.

13. A computing device having a processor configured to be capable of performing a process for fuzz-testing a software application, the process comprising:

based on the type of the logical relation defined in the fuzzing schema, updating the one or more other elements of the data structure to be logically consistent with the first element of the tree by, according to the relation element, computing a new length of count of the one or more other elements from the fuzzed first elements; and generating fuzzed input data for the software application using the tree with the fuzzed first element and the updated one or more other elements.

14. A computing device according to claim 13, wherein the type of the logical relation comprises either: a length relation, an offset relation, a count relation, a presence relation, a checksum relation, or a hash relation.

15. A computing device according to claim 13, wherein the fuzzing comprises adding or removing an element from the tree and the type of the logical relation comprises either a count of elements or a presence of an element.

16. A computing device according to claim 13, wherein the fuzzing comprises replacing the input data in the first element of the data structure with randomly generated data.

17. A computing device according to claim 13, wherein if the one or more other elements of the data structure are not updated based on the logical relation, then a portion of the software application for handling the logically related portion of the original input data will not be tested by the generated fuzzed input data.

18. A computing device according to claim 13, wherein the input data is sent to the software application, is intercepted by the testing process, and the fuzzed input data is sent to the software application in place of the original input data, where the fuzzed input data comprises unfuzzed parts of the original input data, the fuzzed part of the original input data, and the logically related updated part(s) of the original input data.

* * * * *